(12) United States Patent
Coca et al.

(10) Patent No.: US 7,335,705 B2
(45) Date of Patent: *Feb. 26, 2008

(54) THERMOSETTING COATING COMPOSITIONS COMPRISING A COPOLYMER FORMED FROM CHLOROTRIFLUOROETHYLENE AND METHODS OF MAKING COPOLYMERS FORMED FROM CHLOROTRIFLUOROETHYLENE

(75) Inventors: Simion Coca, Pittsburgh, PA (US); Edward R. Coleridge, Lower Burrell, PA (US); James B. O'Dwyer, Valencia, PA (US); Brian E. Woodworth, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 211 days.

This patent is subject to a terminal disclaimer.

(21) Appl. No.: 11/241,344

(22) Filed: Sep. 30, 2005

(65) Prior Publication Data

US 2006/0074179 A1 Apr. 6, 2006

Related U.S. Application Data

(60) Provisional application No. 60/614,655, filed on Sep. 30, 2004.

(51) Int. Cl.
*C08F 114/18* (2006.01)

(52) U.S. Cl. .............. 525/326.3; 525/326.6; 525/328.8; 525/329.2; 525/330.1; 525/374; 525/379; 525/386; 525/394; 526/249

(58) Field of Classification Search ............ 525/326.3, 525/326.6, 328.8, 329.2, 329.4, 329.9, 330.1, 525/374, 379, 386, 394; 526/249
See application file for complete search history.

(56) References Cited

U.S. PATENT DOCUMENTS

| | | | |
|---|---|---|---|
| 2,419,009 A | 4/1947 | Coffman et al. .............. 260/86 |
| 2,468,664 A | 4/1949 | Hanford et al. .............. 260/86 |
| 2,600,684 A | 6/1952 | Pearson ..................... 260/87.1 |
| 3,429,846 A | 2/1969 | Bechtold et al. ........... 260/29.6 |
| 3,651,003 A | 3/1972 | Bechtold .............. 260/31.2 XA |
| 4,183,837 A | 1/1980 | Tamura et al. .......... 260/31.8 F |
| 4,345,057 A | 8/1982 | Yamabe et al. .............. 526/247 |
| 4,584,343 A | 4/1986 | Löhr et al. ..................... 525/60 |
| 4,788,266 A | 11/1988 | Koishi et al. ................. 526/249 |
| 5,032,656 A | 7/1991 | Mares et al. ................. 526/255 |
| 5,200,442 A | 4/1993 | Schlipf et al. .............. 523/340 |
| 5,612,416 A | 3/1997 | McCollum et al. ......... 525/123 |
| 5,684,074 A | 11/1997 | Hirashima et al. .......... 524/265 |
| 5,712,355 A | 1/1998 | Jones ......................... 526/254 |
| 5,750,770 A | 5/1998 | McEntire et al. ........... 560/200 |
| 6,153,697 A | 11/2000 | Montague et al. .......... 525/123 |
| 6,517,905 B2 | 2/2003 | White et al. ............. 427/385.5 |
| 6,638,578 B2 | 10/2003 | Barkac et al. .............. 427/487 |
| 6,642,301 B2 | 11/2003 | White et al. ................. 524/560 |
| 6,670,043 B2 | 12/2003 | Barkac et al. ........... 428/423.1 |
| 6,677,422 B2 | 1/2004 | Coca et al. ............... 526/348.7 |
| 6,686,432 B2 | 2/2004 | Coca et al. ............... 526/348.7 |
| 6,803,426 B2 * | 10/2004 | Coleridge et al. ....... 525/326.3 |
| 2001/0037007 A1 | 11/2001 | Lousenberg et al. ........ 526/255 |
| 2003/0171498 A1 | 9/2003 | Coleridge et al. ....... 525/326.2 |

FOREIGN PATENT DOCUMENTS

| | | |
|---|---|---|
| EP | 0508229 A2 | 10/1992 |
| EP | 1233044 A1 | 8/2002 |
| EP | 1398357 A1 | 3/2004 |
| JP | 62211602 | 9/1987 |

OTHER PUBLICATIONS

Asahi Glass Co., Ltd, Research & Development/R&D Library, vol. 51, paper 7, 8 pages, Ishida et al, "Effect of Monomer Sequence on Polymer Durability in Copolymers of Chlorotrifluoroethylene with Alkyl Vinyl Esters or Alkyl Vinyl Ethers" (2001).

* cited by examiner

*Primary Examiner*—Bernard Lipman
(74) *Attorney, Agent, or Firm*—Donald R. Palladino

(57) ABSTRACT

Fluoropolymers are disclosed. The fluoropolymers include (i) units derived from a fluoromonomer composition comprising chlorotrifluoroethylene, and (ii) units derived from at least one donor monomer composition. In the disclosed fluoropolymers, units (i) and (ii) are distributed along the fluoropolymer chain in a substantially alternating fashion. Also disclosed are thermosetting compositions containing such fluoropolymers, substrates coated with such compositions, methods for making such compositions, and methods for coating substrates with such compositions.

20 Claims, No Drawings

US 7,335,705 B2

THERMOSETTING COATING COMPOSITIONS COMPRISING A COPOLYMER FORMED FROM CHLOROTRIFLUOROETHYLENE AND METHODS OF MAKING COPOLYMERS FORMED FROM CHLOROTRIFLUOROETHYLENE

CROSS-REFERENCE TO RELATED APPLICATIONS

This application claims the benefit of U.S. Provisional Patent Application Ser. No. 60/614,655, filed Sep. 30, 2004, which is incorporated by reference herein in its entirety.

FIELD OF THE INVENTION

The present invention relates generally to copolymers formed from chlorotrifluoroethylene. Certain embodiments of the present invention are directed to thermosetting coating compositions comprising such copolymers. Certain embodiments of the present invention are directed to methods for making substantially alternating copolymers formed from chlorotrifluoroethylene and at least one donor monomer, copolymers produced by those methods, and coating compositions comprising such copolymers. The present invention is also directed to multi-layer composite coatings that include a coating layer deposited from such compositions, and substrates at least partially coated with such compositions.

BACKGROUND OF THE INVENTION

Hydroxy-functional fluoropolymers are known to be useful in coating compositions. For example, U.S. Pat. No. 4,345,057 details the synthesis of fluorinated ethylene-hydroxy-alkyl vinyl ether (FEVE) copolymers and their application in thermosetting coating compositions. Such coatings are useful in forming high gloss, durable topcoats for building panels, automotive body panels, and automotive body parts, among other things.

Notwithstanding their excellent properties, the use of hydroxyl-functional vinyl ethers as the source of the reactable hydroxyl group in these fluoropolymers provides a coating polymer that is relatively expensive. While the good durability of these FEVE coatings is known in the coatings industry, there is a need for more cost-effective fluoropolymers that can provide coatings having similar properties.

U.S. Pat. No. 6,153,697 discloses durable, chemically-resistant films made from terpolymers derived from fluoromonomers, olefins, and diesters of unsaturated anhydrides wherein at least one of the esterifying groups includes a hydroxyl group. While coatings containing such terpolymers may provide cost-efficient compositions that have many of the highly desirable properties of those derived from hydroxyl-functional fluoropolymers, such as those mentioned earlier, these compositions have the disadvantage of requiring the use of a diester of an unsaturated anhydride, which is a specialty monomer that is not necessarily readily available.

Thus, there is a need for fluoropolymers formed from readily available monomers, which are useful in providing thermosetting coating compositions that can result in cost-effective coatings having durability properties similar to those that include FEVE copolymers.

SUMMARY OF THE INVENTION

In certain respects, the present invention is directed to thermosetting coating compositions that comprise a fluoropolymer composition and a crosslinking agent, wherein the fluoropolymer compositions comprise a reactive functional group containing fluoropolymer comprising (i) units derived from chlorotrifluoroethylene and (ii) units derived from at least one donor monomer, such as a mild donor monomer. In the fluoropolymer, the units (i) and (ii) are distributed along the fluoropolymer chain in a substantially alternating fashion. Such thermosetting compositions comprise at least 20 weight percent of the fluoropolymer, based on the total solid weight of the composition.

The present invention is also directed to multi-layer composite coatings wherein at least one coating layer is deposited from a thermosetting composition of the present invention. In addition, the present invention is directed to substrates at least partially coated with such thermosetting compositions, or, in some cases, substrates at least partially coated with such multi-layer composite coatings.

In other respects, the present invention is directed to methods of making a fluoropolymer composition. These methods of the present invention comprise the steps of (a) providing a donor monomer composition comprising at least one donor monomer; (b) providing a fluoromonomer composition comprising chlorotrifluoroethylene; (c) providing a free radical polymerization initiator; (d) adding and mixing the components provided in steps (a), (b), and (c), wherein the mole ratio of chlorotrifluoroethylene to donor monomer that is mixed is no more than 4:1; and (e) polymerizing the monomers at conditions that produce a fluoropolymer wherein units derived from the fluoromonomer and units derived from the donor monomer are distributed along the fluoropolymer chain in a substantially alternating fashion.

In yet other respects, the present invention is directed to methods for coating a substrate. These methods of the present invention comprise the steps of (a) depositing on a substrate a thermosetting composition; (b) coalescing the thermosetting composition to form a substantially continuous film on the substrate; and (c) curing the thermosetting composition. In these methods, the thermosetting composition comprises a thermosetting composition of the present invention or a thermosetting composition produced by a method of the present invention.

DETAILED DESCRIPTION OF EMBODIMENTS OF THE INVENTION

For purposes of the following detailed description, it is to be understood that the invention may assume various alternative variations and step sequences, except where expressly specified to the contrary. It is also to be understood that the specific devices and processes described in the following specification are simply exemplary embodiments of the invention. Hence, any specific dimensions or other physical characteristics related to the embodiments disclosed herein are not to be considered as limiting. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Certain embodiments of the present invention are directed to fluoropolymer compositions. These fluoropolymer compositions comprise (i) units derived from chlorotrifluoroethylene; and (ii) units derived from at least one donor monomer, such as a mild donor monomer.

As used herein, the term "fluoropolymer composition" refers to a composition that includes a synthesized fluoropolymer as well as residues from initiators, catalysts, and other elements attendant to the synthesis of the fluoropolymer. Such residues and other elements considered as part of the fluoropolymer composition are typically mixed or co-mingled with the copolymer such that they tend to remain with the copolymer when it is transferred between vessels or between solvent or dispersion media.

The fluoropolymers present in the fluoropolymer compositions of the present invention comprise units derived from chlorotrifluoroethylene (CTFE). In certain embodiments, the CTFE is present in an amount of up to 50 mol %, such as 25 to 50 mol %, of the total moles of material present in the fluoropolymer composition. As will be understood by those skilled in the art, the level of CTFE used is determined by the properties that are to be incorporated into the fluoropolymer composition. The CTFE may be present in the fluoropolymer composition in any range of value inclusive of the recited values.

The fluoropolymers present in the fluoropolymer compositions of the present invention also comprise units derived from at least one donor monomer composition, such as a composition comprising a mild donor monomer. As used herein, the term "donor monomer" refers to monomers that have a polymerizable ethylenically unsaturated group that has a relatively high electron density in the ethylenic double bond. This concept has been quantified to an extent by the Alfrey-Price Q-e scheme (Robert Z. Greenley, Polymer Handbook, Fourth Edition, Brandrup, Immergut and Gulke, editors, Wiley & Sons, New York, N.Y., pp. 309-319 (1999)).

Chlorotrifluoroethylene is an acceptor monomer. As used herein, the term "acceptor monomer" refers to a monomer that has a polymerizable ethylenically unsaturated group that has relatively low electron density in the ethylenic double bond.

In the Q-e scheme referenced above, Q reflects the reactivity of a monomer and e reflects the polarity of the monomer, which indicates the electron density of a given monomer's polymerizable ethylenically unsaturated group. A positive value for e indicates that a monomer has a relatively low electron density and is an acceptor monomer. A low or negative value for e indicates that a monomer has a relatively high electron density and is a donor monomer. Any e values recited herein are those appearing in the Polymer Handbook unless otherwise indicated. Chlorotrifluoroethylene has an e value of 1.56.

As used herein, the term "strong donor monomer" refers to those monomers with an e value of less than −1.5, while the term "mild donor monomer" refers to those monomers with an e value of less than 0.5 to those with an e value of −1.5.

Any suitable donor monomer may be included in the donor monomer composition used to form the fluoropolymer compositions of the present invention, including mixtures of two or more donor monomers. Suitable donor monomers that may be used include strong donor monomers and, in certain embodiments, mild donor monomers. Specific examples of suitable donor monomers include, without limitation, ethylene, butene, propylene, styrene, substituted styrenes, α-methyl styrene, isobutylene type monomers, methacrylate type monomers (such as methyl methacrylate, ethyl methacrylate, propyl methacrylate, isopropyl methacrylate, butyl methacrylate, isopropyl methacrylate, butyl methacrylate, isobutyl methacrylate, tert-butyl methacrylate, 2-ethylhexyl methacrylate, lauryl methacrylate, isobornyl methacrylate, cyclohexyl methacrylate, 3,3,5-trimethylcyclohexyl methacrylate, glycidyl methacrylate, and functional methacrylates, such as hydroxyalkyl methacrylates, oxirane functional methacrylates, and carboxylic acid functional methacrylates), vinyl esters, vinyl pyridines, divinyl benzene, vinyl naphthalene, and divinyl naphthalene, including mixtures thereof.

In certain embodiments of the present invention, the donor monomer comprises a vinyl ester, an isobutylene type monomer, or a mixture thereof. Suitable vinyl esters include, without limitation, vinyl esters of carboxylic acid, such as vinyl acetate (VAc), vinyl butyrate, vinyl 3,4-dimethoxybenzoate, vinyl propionate, vinyl neodecanoate, vinyl pivalate, vinyl neononanoate, and vinyl benzoate, including mixtures thereof. In certain embodiments of the present invention, the donor monomer specifically excludes vinyl ether.

As used herein, the term "isobutylene type monomers" refers to donor monomers having the following structure (i):

where $R^1$ is linear or branched $C_1$ to $C_4$ alkyl, and $R^2$ is one or more of methyl, linear, cyclic or branched $C_1$ to $C_{20}$ alkyl, alkenyl, aryl, alkaryl or arakyl.

In certain embodiments, the donor monomer is present in an amount of up to 50 mol %, such as 50 to 75 mol %, based on the total moles of material present in the fluoropolymer composition. As will be understood by those skilled in the art, the level of donor monomer used is determined by the properties that are to be incorporated into the fluoropolymer composition. The donor monomer may be present in the fluoropolymer composition in any range of value inclusive of the recited values.

A non-limiting list of published e values for suitable donor monomers are shown in Table 1.

TABLE 1

Alfrey-Price e values for Selected Monomers

| Monomer Donor Monomers | e value |
| --- | --- |
| Isobutylene | −1.20[1] |
| Diisobutylene | 0.49[2] |
| Vinyl Acetate | −0.22[1] |
| Vinyl Pivalate | −0.75[3] |
| Vinyl Neodecanoate | −0.64[3] |
| Vinyl Neononanoate | −0.48[3] |
| α-Methyl Styrene | −0.81[1] |
| Methyl Methacrylate | 0.40[1] |
| Butyl Methacrlyate | 0.28[1] |
| Ethyl Methacrylate | 0.17[1] |
| Glycidyl Methacrylate | 0.20[1] |

[1]Polymer Handbook, Fourth Edition (1999)
[2]Rzaev et al., Eur. Polym. J., Vol. 24, No. 7, pp. 981-985 (1998)
[3]Polymer Handbook, Second Edition (1975)

In certain embodiments of the fluoropolymers present in the fluoropolymer compositions of the present invention, the difference between the e value of CTFE and the donor monomer is at least 1.0, such as 1.0 to 1.8.

As mentioned previously, in the fluoropolymers present in the fluoropolymer compositions of the present invention, the CTFE units and the donor monomer units are distributed along the fluoropolymer chain in a substantially alternating fashion. As will be appreciated by those skilled in the art, the degree of alternation can be determined by 13C Fourier Transform Nuclear Magnetic Resonance Spectroscopy. As used herein, the term "substantially alternating" means that most, i.e. at least a majority, of the fluorinated units and donor monomer units present within the fluoropolymer comprise alternating sequences of donor monomer-fluoromonomer pairs, having the alternating monomer residue units of structure (II):

—[DM-FM]— (II)

where DM represents a residue from a donor monomer and FM represents a fluorinated unit, i.e., a residue from CTFE, as opposed to blocks of DM or FM monomeric units. In certain embodiments, the fluoropolymer present in the fluoropolymer compositions of the present invention comprises at least 70 mole percent, such as at least 75 mole percent, of alternating monomer residues as described above. It is believed that there may be amounts of end groups, and short segments, such as segments having dimer and trimer length, which are not measured as alternating but are not considered blocks which significantly alter the properties of the fluoropolymer.

In certain embodiments, the fluoropolymer present in the fluoropolymer compositions of the present invention has a number average molecular weight ranging from 500 to 10,000, such as 750 to 10,000 or, in some cases, 1,000 to 5,000. The molecular weight of the fluoropolymer is selected based on the properties desired to be incorporated into the fluoropolymer composition. The molecular weight of the fluoropolymer may vary in any range of values inclusive of the recited values.

The polydispersity index (PDI) of the fluoropolymer is not always critical. The PDI of the fluoropolymer is usually less than 4, such as less than 3.0, or, in some cases, less than 2.0. As used herein, "polydispersity index" is determined from the following equation: (weight average molecular weight (Mw)/number average molecular weight (Mn)). A monodisperse polymer has a PDI of 1.0. All of the Mn and Mw values reported herein are determined from gel permeation chromatography (GPC) using polystyrene standards.

In certain embodiments of the fluoropolymer compositions of the present invention, the fluoropolymer comprises alternating sequences of donor monomer and CTFE residues having the alternating structure (III):

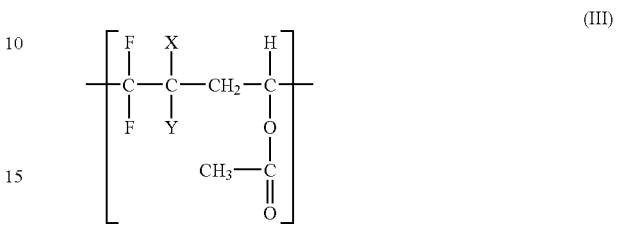

where X is F and Y is Cl.

In certain embodiments, the fluoropolymer composition of the present invention may also include other polymerizable ethylenically unsaturated monomers, though, in other embodiments, such monomers are not present in any substantial amount (meaning that such other polymerizable ethylenically unsaturated monomers are present, if at all, at minor or inconsequential levels that do not significantly effect the properties of the fluoropolymer composition). As a result, in the embodiments wherein other polymerizable ethylenically unsaturated monomers are present, the fluoropolymer present in the fluoropolymer compositions of the present invention may contain alternating segments and random segments of a copolymer of CTFE, donor monomer, and other monomers.

The residues from the other ethylenically unsaturated monomers are derived from at least one ethylenically unsaturated radically polymerizable monomer. As used herein, the term "ethylenically unsaturated radically polymerizable monomer" and like terms is meant to include vinyl monomers, allylic monomers, olefins, and other ethylenically unsaturated monomers that are radically polymerizable and not classified as donor monomers or acceptor monomers.

As used herein, the term "allylic monomer(s)" refers to monomers containing substituted and/or unsubstituted allylic functionality, i.e., one or more radicals represented by the following general formula (IV):

where $R^{10}$ is hydrogen, halogen, or a $C_1$ to $C_4$ alkyl group. Often, $R^{10}$ is hydrogen or methyl, and, consequently, general formula (VI) often represents the unsubstituted (meth)allyl radical, which encompasses both allyl and methallyl radicals. Examples of allylic monomers include, without limitation, (meth)allyl alcohol, (meth)allyl ethers, such as methyl (meth)allyl ether; allyl esters of carboxylic acids, such as (meth)allyl acetate, (meth)allyl butyrate, and (meth)allyl benzoate.

In certain embodiments, the fluoropolymer compositions of the present invention may include other acceptor monomers, aside from CTFE. Suitable other acceptor monomers include those disclosed in U.S. Pat. No. 6,686,432 at col. 7, line 39 to col. 8, line 67, which is incorporated herein by reference. In certain embodiments, the fluoropolymer compositions of the present invention are substantially free of such other acceptor monomers (meaning that such other acceptor monomers are present, if at all, at minor or inconsequential levels that do not significantly effect the properties of the fluoropolymer composition).

The present invention is also directed to methods of making fluoropolymer compositions. The fluoropolymer compositions of the present invention can be prepared by methods that include the steps of (a) providing a donor monomer composition comprising at least one donor monomer; (b) providing a fluoromonomer composition comprising CTFE; (c) providing a free radical polymerization initiator; (d) mixing the components provided in steps (a), (b), and (c); and (e) polymerizing the monomers at conditions that produce a fluoropolymer wherein units derived from the fluoromonomer and units derived from the donor monomer are distributed along the fluoropolymer chain in a substantially alternating fashion.

In these methods of the present invention, the donor monomer composition, the fluoromonomer composition, and the free radical polymerization initiator are mixed together, such as by separately and simultaneously adding and mixing them together in a reaction vessel. In certain embodiments, the donor monomer composition, the fluoromonomer composition, and the initiator are added at rates such that each of their respective additions is completed in about the same time period. For example, each of these components may be added over a period of at least 15 minutes, in some cases at least 20 minutes, in other cases at least 30 minutes, and, in some cases, at least 1 hour. In certain embodiments, the addition time is not so long as to render the process economically unfeasible on a commercial scale. The addition time may vary in any range of values inclusive of those stated above.

In these methods of the present invention, the mole ratio of CTFE to donor monomer that is added is no more than 4:1, no more than 2:1, or, in some embodiments, 1:1. The mole ratio of fluoromonomer to donor monomer that is added to the mixture is selected based on the properties desired to be incorporated into the fluoropolymer composition.

After mixing or during addition and mixing, polymerization of the monomers takes place. In the methods of the present invention, the polymerization may be conducted at any suitable temperature that results in a fluoropolymer wherein the fluoromonomer units and the donor monomer units are distributed along the fluoropolymer chain in a substantially alternating fashion. Suitable temperatures include ambient, 50° C. to 300° C., 60° C. to 275° C., 75° C. to 250° C., or 100° C. to 225° C. The temperature is typically high enough to encourage good reactivity from the monomers and initiators employed. However, the volatility of the monomers and corresponding partial pressures create a practical upper limit on temperature determined by the pressure rating of the reaction vessel. The polymerization temperature may vary in any range of values inclusive of those stated above.

In the methods of the present invention, the polymerization may be conducted at any suitable pressure. Suitable pressures include up to 2000 psi, up to 1000 psi, up to 600 psi, or, in some cases, 100 psi to 600 psi. The pressure is typically high enough to maintain the monomers in a supercritical fluid phase. The pressures employed have a practical upper limit based on the pressure rating of the reaction vessel employed. The pressure during polymerization temperature may vary in any range of values inclusive of those stated above.

Any suitable free radical initiator may be used in the methods of making fluoropolymer compositions of the present invention. Examples of suitable free radical initiators include, without limitation, thermal free radical initiators, photo-initiators, and redox initiators. Examples of suitable thermal free radical initiators include, without limitation, peroxide compounds, azo compounds, and persulfate compounds.

Examples of suitable peroxide compound initiators include, without limitation, hydrogen peroxide, methyl ethyl ketone peroxides, benzoyl peroxides, di-t-butyl peroxide, di-t-amyl peroxide, dicumyl peroxide, diacyl peroxides, decanoyl peroxides, lauroyl peroxides, peroxydicarbonates, peroxyesters, dialkyl peroxides, hydroperoxides, peroxyketals, and mixtures thereof.

Examples of suitable azo compounds include, but are not limited to, 4-4'-azobis(4-cyanovaleric acid), 1-1'-azobiscyclohexanecarbonitrile, 2-2'-azobisisobutyronitrile, 2-2'-azobis(2-methylpropionamidine)dihydrochloride, 2-2'-azobis(2-methylbutyronitrile), 2-2'-azobis(propionitrile), 2-2'-azobis(2,4-dimethylvaleronitrile), 2-2'-azobis(valeronitrile), 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethyleneisobutyramidine)dihydrochloride, and 2-(carbamoylazo)-isobutyronitrile.

In certain embodiments of the present invention, the fluoropolymers previously described may be utilized as a starting material for the preparation of functional group containing polymers by using functional group transformations by methods known in the art. Functional groups that can be introduced to the fluoropolymers include epoxy, carboxylic acid, hydroxy, amide, oxazoline, acetoacetate, isocyanate, carbamate, amine, amine salt, quaternary ammonium, thioether, sulfide, sulfonium and phosphate groups, among others. Suitable methods for introducing such functional groups to the fluoropolymers of the present invention include methods described in U.S. Pat. No. 6,686,432B2 at col. 13, line 16 to col. 14, line 26, which is incorporated herein by reference.

In certain embodiments, such as in the case where the previously described fluoropolymers are derived from CTFE and a vinyl ester, such as vinyl acetate, such a fluoropolymer may be partially or completely transesterified to form a corresponding fluoropolymer of CTFE/vinyl alcohol or CTFE/vinyl alcohol/vinyl ester. Such a transesterification may be conducted by any suitable means. For example, the transesterification of the fluoropolymer may be conducted by dissolving the fluoropolymer in a suitable solvent, such as methanol, in the presence of a suitable base, such as sodium methoxide, potassium carbonate, or lithium carbonate, or a suitable acid catalyst, such as p-toluenesulfonic acid, sulfuric acid, or a Lewis acid, and removing low molecular weight esters, such as methyl acetate. In certain embodiments, at least 25 percent of the fluoropolymer is transesterified as described above.

The present invention is also directed to thermosetting compositions. As used herein, the term "thermosetting" refers to polymeric compositions that "set" irreversibly upon curing or crosslinking, wherein the polymer chains of the polymeric components are joined together by covalent bonds. This property is usually associated with a crosslinking reaction of the composition constituents often induced, for example, by heat or radiation. See Hawley, Gessner G., The Condensed Chemical Dictionary, Ninth Edition., page 856; Surface Coatings, vol. 2, Oil and Colour Chemists' Association, Australia, TAFE Educational Books (1974). Curing or crosslinking reactions also may be carried out under ambient conditions. Once cured or crosslinked, a thermosetting resin will not melt upon the application of heat and is insoluble in solvents.

As used herein, the term "cure" means that any crosslinkable components of the composition are at least partially crosslinked. In certain embodiments, the crosslink density of the crosslinkable components, i.e., the degree of crosslinking, ranges from 5% to 100% of complete crosslinking, such as 35% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the glass transition temperature and crosslink density of free films of coatings or polymers. These physical properties of a cured material are related to the structure of the crosslinked network.

According to this method, the length, width, and thickness of a sample to be analyzed are first measured, the sample is tightly mounted to the Polymer Laboratories MK III apparatus, and the dimensional measurements are entered into the apparatus. A thermal scan is run at a heating rate of 3° C. per minute, a frequency of 1 Hz, a strain of 120%, and a static force of 0.01 N, and sample measurements occur every two seconds. The mode of deformation, glass transition temperature, and crosslink density of the sample can be determined according to this method. Higher crosslink density values indicate a higher degree of crosslinking in the coating.

The thermosetting compositions of the present invention may be in the form of liquid coating compositions, examples of which include aqueous and solvent-based coating compositions and electrodepositable coating compositions. The thermosetting compositions of the present invention may also be in the form of a co-reactable solid in particulate form, such as a powder coating composition. Regardless of the form, the thermosetting compositions of the present invention may be pigmented or clear, and may be used alone or in combination as primers, basecoats, or topcoats.

The thermosetting compositions of the present invention include: (a) at least one reactive functional group containing fluoropolymer of the type described earlier, and (b) at least one crosslinking agent that comprises at least two functional groups reactive with the functional groups of the fluoropolymer.

The fluoropolymer compositions described earlier may be used in the thermosetting composition of the present invention as a resinous binder or as an additive in combination with a separate resinous binder. When used as an additive, the fluoropolymer compositions as described herein may have low functionality (they may be monofunctional) and have a correspondingly high equivalent weight. Alternatively, for other applications such as use as a reactive diluent, the additive may be highly functional with a correspondingly low equivalent weight.

In certain embodiments, the fluoropolymer is present in the thermosetting coating composition in an amount of up to at least 20 weight percent and/or up to 80 weight percent, such as 20 to 80 weight percent, 40 to 80 weight percent, or, in some cases, 50 to 80 weight percent, with weight percent being based on the total solid weight of the composition. The fluoropolymer may be present in the thermosetting composition in an amount ranging between any combination of these values, inclusive of the recited values.

As previously indicated, the thermosetting compositions of the present invention comprise a crosslinking agent having at least two functional groups that are reactive with functional groups of the fluoropolymer. Not wishing to be limited to any one set of functional groups, there are several examples of co-reactive functional groups that can be used in the thermosetting compositions of the present invention. For example, the functional groups of the first reactant, i.e., the fluoropolymer, may comprise any of the functional groups identified earlier, among others, and the functional groups of the second reactant, i.e., the crosslinking agent, may comprise any functional group that is different from the functional groups contained in the fluoropolymer and that is co-reactive towards the functional groups of the fluoropolymer.

Crosslinking agents suitable for use in the thermosetting compositions of the present invention include aminoplast resins, phenoplast resins, and mixtures thereof, as curing agents for hydroxy, carboxylic acid, amide, and carbamate functional group containing materials. Examples of aminoplast and phenoplast resins suitable for use as crosslinking agents in certain thermosetting compositions of the present invention include those described in U.S. Pat. No. 3,919,351 and col. 5, line 22 to col. 6, line 25, which is incorporated herein by reference.

Polyisocyanates and blocked polyisocyanates are also suitable for use as crosslinking agents in certain thermosetting compositions of the present invention, such as when the fluoropolymer described above comprises hydroxy functional groups or primary and/or secondary amino groups. Examples of polyisocyanates and blocked isocyanates suitable for use as crosslinking agents in certain thermosetting compositions of the present invention include those described in U.S. Pat. No. 4,546,045 at col. 5, lines 16 to 38 and U.S. Pat. No. 5,468,802 at col. 3, lines 48 to 60, both of which are incorporated herein by reference.

Anhydrides as crosslinking agents for hydroxy and primary and/or secondary amino group containing materials are also suitable for use in certain thermosetting compositions of the present invention and are known in the art. Examples of anhydrides suitable for use as crosslinking agents in certain compositions of the present invention include those described in U.S. Pat. No. 4,798,746 at col. 10, lines 16 to 50 and U.S. Pat. No. 4,732,790 at col. 3, lines 41 to 57, both of which are incorporated herein by reference.

Polyepoxides as crosslinking agents for carboxylic acid functional group containing materials are suitable for use in certain thermosetting compositions of the present invention and are known in the art. Examples of polyepoxides suitable for use as crosslinking agents in certain compositions of the present invention include those described in U.S. Pat. No. 4,681,811 at col. 5, lines 33 to 58, which is incorporated herein by reference.

Polyacids as crosslinking agents for epoxy functional group containing materials are suitable for use in certain thermosetting compositions of the present invention and are known in the art. Examples of polyacids suitable for use as crosslinking agents in certain compositions of the present invention include those described in U.S. Pat. No. 4,681,811 at col. 6, line 45 to col. 9, line 54, which is incorporated herein by reference.

Polyols, that is, material having an average of two or more hydroxyl groups per molecule, are known in the art for use as crosslinking agents for isocyanate functional group containing materials and anhydrides and esters. Polyacids are suitable for use as crosslinking agents in certain compositions of the present invention, including those described in U.S. Pat. No. 4,046,729 at col. 7, line 52 to col. 8, line 9; col. 8, line 29 to col. 9, line 66; and in U.S. Pat. No. 3,919,315 at col. 2, line 64 to col. 3, line 33, both of which are incorporated herein by reference.

Polyamines as crosslinking agents for isocyanate functional group containing materials and for carbonates and unhindered esters are suitable for use in certain compositions of the present invention and are known in the art. Examples of polyamines suitable for use as crosslinking agents in certain compositions of the present invention include those described in U.S. Pat. No. 4,046,729 at col. 6, line 61 to col. 7, line 26, which is incorporated herein by reference.

When desired, appropriate mixtures of crosslinking agents may be used. Moreover, the thermosetting compositions of the present invention can be formulated as a one-component composition where a crosslinking agent, such as an aminoplast resin and/or a blocked isocyanate compound, such as those described above, is admixed with other composition components. Such one-component compositions can be storage stable as formulated. Alternatively, compositions may be formulated as two-component compositions where, for example, a polyisocyanate crosslinking agent, such as those described above, can be added to a pre-formed admixture of the other composition components just prior to application. The pre-formed admixture may comprise crosslinking agents, such as aminoplast resins and/or blocked isocyanate compounds, such as those described earlier.

In certain embodiments, the crosslinking agent is present in the thermosetting composition in an amount of up to 40 weight percent, such as 20 to 40 weight percent, this weight percent being based on the total solid weight of the coating composition. The amount of crosslinking agent present in the thermosetting composition of the present invention may range between any combination of these values, inclusive of the recited values.

In certain embodiments, wherein the fluoropolymer comprises hydroxyl functional groups, the equivalent ratio of hydroxyl groups in the fluoropolymer to reactive functional groups in the crosslinking agent may be within the range of 1:0.5 to 1:1.5, such as 1:0.8 to 1:1.2.

As mentioned earlier, the fluoropolymer compositions described earlier may be used in the thermosetting compositions of the present invention as an additive in combination with a separate resinous binder. Suitable resinous binders that may be used in the thermosetting compositions of the present invention, in addition to the fluoropolymer compositions, include, hydroxyl or carboxylic acid-containing acrylic copolymers, hydroxyl or carboxylic acid-containing polyester polymers and oligomers, isocyanate or hydroxyl-containing polyurethane polymers, and/or amine or isocyanate-containing polyureas, among others.

Acrylic polymers, if used, are typically copolymers of acrylic acid or methacrylic acid or hydroxyalkyl esters of acrylic or methacrylic acid such as hydroxyethyl methacrylate or hydroxypropyl acrylate with one or more other polymerizable ethylenically unsaturated monomers such as alkyl esters of acrylic acid including methyl methacrylate and 2-ethyl hexyl acrylate, and vinyl aromatic compounds such as styrene, alpha-methyl styrene and vinyl toluene. The ratio of reactants and reaction conditions are selected to result in an acrylic polymer with pendant hydroxyl or carboxylic acid functionality.

Besides acrylic polymers, a polyester polymer or oligomer may be used. Such polymers may be prepared in a known manner by condensation of polyhydric alcohols and polycarboxylic acids. Suitable polyhydric alcohols include, for example, ethylene glycol, neopentyl glycol, trimethylol propane and pentaerythritol.

Suitable polycarboxylic acids include, for example, adipic acid, 1,4-cyclohexyl dicarboxylic acid and hexahydrophthalic acid. Besides the polycarboxylic acids mentioned above, functional equivalents of the acids such as anhydrides where they exist or lower alkyl esters of the acids such as the methyl esters may be used. Also, small amounts of monocarboxylic acids such as stearic acid may be used.

Hydroxyl-containing polyester oligomers can be prepared by reacting an anhydride of a dicarboxylic acid such as hexahydrophthalic anhydride with a diol such as neopentyl glycol in a 1:2 molar ratio.

Where it is desired to enhance air-drying, suitable drying oil fatty acids may be used and include, for example, those derived from linseed oil, soya bean oil, tall oil, dehydrated castor oil or tung oil, among others.

Polyurethane polymers containing terminal isocyanate or hydroxyl groups may also be used. Polyurethane polyols or NCO-terminated polyurethanes that can be used include, for example, those prepared by reacting polyols including polymeric polyols with polyisocyanates. The polyurea-containing terminal isocyanate or primary or secondary amine groups which can be used include, for example, those prepared by reacting polyamines including polymeric polyamines with polyisocyanates. The hydroxyl/isocyanate or amine/isocyanate equivalent ratio is adjusted and reaction conditions selected to obtain the desired terminal group. Examples of suitable polyisocyanates include those described in U.S. Pat. No. 4,046,729 at column 5, line 26 to column 6, line 28, incorporated herein by reference. Examples of suitable polyols include those described in U.S. Pat. No. 4,046,729 at column 7, line 52 to column 10, line 35, incorporated herein by reference. Examples of suitable polyamines include those described in U.S. Pat. No. 4,046,729 at column 6, line 61 to column 7, line 32 and in U.S. Pat. No. 3,799,854 at column 3, lines 13 to 50, both incorporated herein by reference.

In certain embodiments, the thermosetting compositions of the present invention also contain catalysts to accelerate the cure of the crosslinking agent with reactive groups on the fluoropolymer(s). Suitable catalysts for aminoplast cure include acids, such as acid phosphates and sulfonic acid or a substituted sulfonic acid. Examples include dodecylbenzene sulfonic acid, paratoluene sulfonic acid, phenyl acid phosphate, ethylhexyl acid phosphate, and the like. Suitable catalysts for isocyanate cure include organotin compounds such as dibutyltin oxide, dioctyltin oxide, dibutyltin dilaurate, and the like. In certain embodiments of the present invention, the catalyst is present in the thermosetting composition in an amount of 0.05 to 5.0 percent by weight, such as 0.25 to 2.0 percent by weight, based on the total weight of resin solids in the thermosetting composition.

In certain embodiments, the thermosetting compositions of the present invention are used as film-forming (coating) compositions, and may contain adjunct ingredients conventionally used in such compositions. Optional ingredients such as, for example, plasticizers, surfactants, thixotropic agents, anti-gassing agents, organic cosolvents, flow controllers, anti-oxidants, UV light absorbers and similar additives conventional in the art may be included in the composition. Any such additives known in the art can be used, absent compatibility problems. Nonlimiting examples of these materials are described in U.S. Pat. Nos. 4,220,679; 4,403,003; 4,147,769; and 5,071,904. In some cases, these ingredients are present at up to 40 percent by weight based on the total weight of resin solids in the thermosetting composition.

As previously mentioned, the thermosetting compositions of the present invention may be in the form of liquid compositions, that is, waterborne or solventborne systems, wherein the components of the thermosetting composition are dispersed in a diluent. Suitable diluents include organic solvents, water, and/or water/organic solvent mixtures.

In some cases, the liquid thermosetting compositions of the present invention are in the form of solventborne systems. Suitable organic solvents include, for example, alcohols, ketones, aromatic hydrocarbons, glycol ethers, esters or mixtures thereof.

In some cases, the thermosetting compositions of the present invention are in the form of waterborne systems. In these embodiments, the composition is in the form of an aqueous dispersion. The term "dispersion" refers to a two-phase transparent, translucent, or opaque resinous system in which the resin is in the dispersed phase and the water is in the continuous phase. The average particle size of the resinous phase is generally less than 1.0 micron, such as less than 0.5 micron, or less than 0.1 micron.

One advantage of the fluoropolymers of the present invention is that, because they can be of relatively low molecular weight, they can be used in thermosetting coating compositions that contain relatively high solids content, which is often desirable for many reasons that will be apparent to those skilled in the art. In certain embodiments, wherein the thermosetting composition is a liquid thermosetting composition, the compositions comprise at least 40 weight percent, such at least 70 weight percent, or, in some cases, at least 90 weight percent solids, i.e., non-volatiles, with weight percent being based on the total weight of the composition. In these embodiments, the solids may be present in the thermosetting composition in any range of value inclusive of the recited values.

In addition to the components described above, the thermosetting compositions of the present invention may also contain color pigments, such as those conventionally used in surface coatings and may be used as a monocoat, that is, a pigmented coating. The suitability of using a particular pigment will be apparent to those skilled in the art. Suitable pigments include, for example, inorganic, organic, metallic, metallic-effect, and anti-corrosive pigments, including mixtures thereof.

Specific examples of suitable inorganic pigments include, without limitation, titanium dioxide, iron oxides, lead chromate, chromium oxide, chrome green, cadmium sulfide, lithopone pigments, and the like. Specific examples of suitable organic pigments include, without limitation, carbon black; monoazo, diazo, and benzimidazolone yellows, oranges, reds, and browns; phthalocyanine blues and greens; anthraquinone pigments ranging from yellow to blue; quinacridone yellows, reds, and violets; perylene reds and browns; indigoid reds, blues, and violets; thionidigo violets; isoindolinone yellows, oranges and reds; quinoline yellows, among others. Specific examples of suitable metallic pigments include, without limitation, aluminum zinc, lead, bronze, copper, stainless steel, and mica, nickel and tin flakes, among others. Specific examples of suitable anti-corrosive pigments include, without limitation, lead oxide, zinc chromate, zinc phosphate, micaceous iron oxide, among others.

In certain embodiments, the pigment is incorporated into the thermosetting composition in amounts of up to 80 percent by weight, based on the total weight of solids in the composition. The metallic pigment is, in certain embodiments, employed in amounts of 0.5 to 25 percent by weight based on the total weight of solids in the composition. In these embodiments, the pigment may be present in the thermosetting composition in any range of values inclusive of the recited values.

As stated above, the thermosetting compositions of the present invention may be used in a method of coating a substrate comprising applying a thermosetting composition to the substrate, coalescing the thermosetting composition over the substrate in the form of a substantially continuous film, and curing the thermosetting composition.

The thermosetting compositions of the present invention can be applied to various substrates to which they adhere including wood, metals, glass, paper, masonry surfaces, and plastic, among others. The compositions can be applied by conventional means including brushing, dipping, flow coating, spraying and the like, but they are most often applied by spraying. The usual spray techniques and equipment for air spraying and electrostatic spraying and either manual or automatic methods can be used.

After application of the composition to the substrate, the composition is allowed to coalesce to form a substantially continuous film on the substrate. Typically, the film thickness will be 0.01 to 5 mils (0.25 to 127 microns), such as 0.1 to 2 mils (2.54 to 50.8 microns) in thickness. The film is formed on the surface of the substrate by driving solvent, i.e., organic solvent and/or water, out of the film by heating or by an air drying period. In some cases, the heating will only be for a short period of time, sufficient to ensure that any subsequently applied coatings can be applied to the film without dissolving the composition. Suitable drying conditions will depend on the particular composition, but, in general, a drying time of from 1 to 5 minutes at a temperature of 68° F. to 250° F. (20° C. to 121° C.) will be adequate. More than one coat of the composition may be applied to develop the optimum appearance. Between coats the previously applied coat may be flashed, that is, exposed to ambient conditions for 1 to 20 minutes.

The thermosetting compositions of the present invention may be used as part of a multi-layer composite coating composition, such as a "color-plus-clear" coating system, which includes at least one pigmented or colored base coat and at least one clear topcoat. As a result, the present invention is also directed to multi-layer composite coatings, wherein at least one coating layer is deposited from a composition comprising a thermosetting composition of the present invention.

For example, the clear film-forming composition may include the thermosetting composition of the present invention. In such embodiments, the film-forming composition of the base coat in the color-plus-clear system may comprise any composition useful in coatings applications, such as those typically used in automotive OEM applications, automotive refinish applications, industrial coating applications, architectural coating applications, electrocoating applications, powder coating applications, coil coating applications, and aerospace coating applications, among others. The film-forming composition of the base coat typically comprises a resinous binder and a pigment to act as the colorant. Particularly useful resinous binders include the afore-mentioned acrylic polymers, polyesters, including alkyds, and polyurethanes, among others.

The base coat compositions may be solvent borne or waterborne. Suitable waterborne base coats in color-plus-clear compositions include those disclosed in U.S. Pat. No. 4,403,003, and the resinous compositions used in preparing these base coats can be used in the practice of the multi-layer composite coatings of the present invention. Also, waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat.

If desired, the base coat composition may contain additional materials well known in the art of formulated surface coatings, including those discussed above. These materials can constitute up to 40 percent by weight of the total weight of the coating composition.

The base coating compositions can be applied to various substrates to which they adhere by conventional means, but they are most often applied by spraying. The usual spray techniques and equipment for air spraying and electrostatic spraying and either manual or automatic methods can be used.

During application of the base coat composition to the substrate, a film of the base coat is formed on the substrate. Typically, the base coat thickness will be 0.01 to 5 mils (0.25 to 127 microns), preferably 0.1 to 2 mils (2.54 to 50.8 microns) in thickness.

After application of the base coat to the substrate, a film is formed on the surface of the substrate by driving solvent out of the base coat film, by heating or by an air drying period, sufficient to ensure that the clear coat can be applied to the base coat without the former dissolving the base coat composition, yet insufficient to fully cure the base coat. More than one base coat and multiple clear coats may be applied to develop the optimum appearance. Usually between coats, the previously applied coat is flashed.

The clear topcoat composition may be applied to the base coated substrate by any conventional coating technique, such as brushing, spraying, dipping or flowing, but spray applications are often preferred because of superior gloss. Any of the known spraying techniques may be employed, such as compressed air spraying, electrostatic spraying, and either manual or automatic methods.

After application of the clear coat composition to the base coat, the coated substrate may be heated to cure the coating layer(s). In the curing operation, solvents are driven off and the film-forming materials in the composition are crosslinked. The heating or curing operation is usually carried out at a temperature in the range of from at least ambient (in the case of free polyisocyanate crosslinking agents) to 350° F. (ambient to 177° C.) but, if needed, lower or higher temperatures may be used as necessary to activate crosslinking mechanisms.

In certain embodiments, the thermosetting compositions of the present invention can be applied through electrodeposition. In such cases, the compositions include active hydrogen group-containing polymers. The active hydrogen-containing polymer typically has a suitable ionic group, such as anionic and cationic groups. Suitable cationic groups include, but are not limited to onium salt groups.

The active hydrogen group-containing polymer containing onium salt groups may be present in the thermosetting compositions of the invention as a resinous binder (i.e., a film-forming polymer) or as an additive in combination with a separate resinous binder. When used as an additive, for example, as a reactive diluent, the active hydrogen group-containing polymer has a high degree of functionality and a correspondingly low equivalent weight. However, it should be appreciated that for other applications, the additive may have low functionality (it may be monofunctional) and a correspondingly high equivalent weight.

In certain embodiments, the electrodeposition coating composition will typically include (a) a first reactant having functional groups, (b) a second reactant that is a crosslinking agent having functional groups that are co-reactive towards and can form covalent bonds with the functional groups of the first reactant. The first and second reactants of the electrodeposition coating composition may each independently comprise one or more functional species as discussed above with regard to liquid and powder coating compositions.

In some embodiments, the thermosetting compositions of the present invention can be in the form of electrodeposition baths. Such baths are often supplied as two components, (1) a clear feed resin, which often includes an active hydrogen-containing polymer, such as the fluoropolymer disclosed herein, which contains onium salt groups, i.e., the main film-forming polymer, the crosslinking agent, and any additional water-dispersible, non-pigmented components, and (2) a pigment paste, which often includes one or more pigments, a water-dispersible grind resin which can be the same or different from the main film-forming polymer, and, optionally, additives or dispersing aids. Electrodeposition baths (1) and (2) are dispersed in an aqueous medium which comprises water and, often, coalescing solvents. In some cases, the electrodeposition bath may be supplied as a one-component system that contains the main film-forming polymer, the crosslinking agent, the pigment paste, and any optional additives in one package. Such one-component systems are dispersed in an aqueous medium as described above. The electrodeposition baths usually have a resin solids content within the range of 10 to 25 percent by weight based on the total weight of the electrodeposition bath.

As mentioned above, the aqueous medium of the electrodeposition baths (1) and (2) may comprise a coalescing solvent in addition to water. Useful coalescing solvents include hydrocarbons, alcohols, esters, ethers, and ketones. Specific examples of suitable coalescing solvents include, without limitation, isopropanol, butanol, 2-ethylhexanol, isophorone, 2-methoxypentanone, ethylene, and propylene glycol, including the monoethyl, monobutyl, and monohexyl ethers or ethylene or propylene glycol. The amount of coalescing solvent is generally between 0.01 and 25 percent, such as 0.05 to 5 percent, by weight based on the total weight of the aqueous medium.

A pigment composition and, if desired, various additives, such as surfactants, wetting agents, or catalyst, can be included in the dispersion. The pigment composition may be of the conventional type, comprising pigments, such as iron oxides, strontium chromate, carbon black, coal dust, titanium dioxide, talc, barium sulfate, and color pigments, such as cadmium yellow, cadmium red, chromium yellow, and the like, among others. The pigment content of the dispersed is often expressed as a pigment-to-resin ratio, and, such a ratio is often in the range of 0.02 to 1:1. The other additives, if used, are often in the dispersion in amounts of 0.01 to 3 percent by weight based on weight of resin solids.

The thermosetting compositions of the present invention may, in certain embodiments, by applied to a substrate by electrodeposition to a variety of electro-conductive substrate, such as metals, including untreated steel, galvanized steel, aluminum, copper, magnesium, and conductive carbon coated materials. The applied voltage for electrodeposition may be varied and can be, for example, as low as 1 volt to as high as several thousand volts, such as between 50 and 500 volts. The current density is often between 0.5 ampere and 5 ampere per square foot and tends to decrease during electrodeposition indicating the formation of an insulating film.

After the coating has been applied by electrodeposition, it is cured, often by baking at elevated temperatures, such as 90° C. to 260° C., for 1 minute to 40 minutes.

Illustrating the invention are the following examples, which, however, are not to be considered as limiting the invention to their details. Unless otherwise indicated, all parts and percentages in the following examples, as well as throughout the specification, are by weight.

EXAMPLES

Example 1

Synthesis of CTFE-Vinyl Acetate Copolymer

A copolymer of CTFE and vinyl acetate was polymerized from the ingredients listed in Table 2 and the procedure set forth below.

TABLE 2

| | Ingredients | Parts by Weight (Grams) |
|---|---|---|
| Charge 1 | Toluene | 850 |
| Charge 2 | t-Amylperoxy(2-ethyl hexanoate) | 85.1 |
| Charge 3 | Chlorotrifluoroethylene | 1631 |
| Charge 4 | Vinyl Acetate | 1204 |

Charge 1 was added to a stainless steel pressure reaction vessel equipped with an agitator, a thermocouple, and a nitrogen inlet, placed under a 5 psig nitrogen pad, and heated to 140° C. Charge 2, 3 and 4 were added over 4 hours maintaining temperature at 140° C. at a final pressure of 125 psig. After the additions of Charges 2 through 4 were completed the reaction mixture was held for 1 hour at 140° C. The reaction mixture was then cooled to ambient temperature.

The measured solids were 75.8 weight percent at 110° C. for 1 hour. The copolymer had an Mn of 1355 and an Mw/Mn of 2.0 (determined by gel permeation chromatography). Monomer distribution was determined by 13C Fourier Transform Nuclear Magnetic Resonance Spectroscopy ("NMR") and the degree of alternation of monomer residues of CTFE and vinyl acetate was 75.5 mol %.

Example 2

Hydrolysis of CTFE-Vinyl Acetate Copolymer from Example 1

The following ingredients were added to a one-liter, four-necked reaction vessel equipped with a thermometer, stirrer, nitrogen inlet, and means for removing the reaction by-product (methyl acetate): 115 grams of copolymer CTFE-vinyl acetate of Example 1 above; 200 grams of methanol. The reaction mixture was heated to 60° C. and 2.3 grams of p-toluene sulfonic acid was added. The reaction mixture was held at that temperature for 5 hours, and 2.3 grams of p-toluene sulfonic acid were added, and the reaction mixture was held for 5 hours. The catalyst was removed by filtration through Magnesol cake. The excess methanol was striped. The sample analyzed by NMR indicated that 70% vinyl acetate was converted to vinyl alcohol.

Example 3

Preparation of Coating Compositions Example 3A

A coating composition was prepared by combining 60 grams of CTFE-vinyl acetate-vinyl alcohol copolymer of Example 2 with 40 grams of melamine Cymel 303 (hexamethoxymethylamine commercially available from Cytec Industries, Inc., West Paterson, N.J.), 300 grams of Dowanol PM (glycol ether commercially available from Dow Chemical Co.), and 1 gram of dodecylbenzene sulfonic acid as catalyst. The mixture was drawn down 3 mil thick over an electrodeposition primer coated steel panel (cold rolled steel panels 4"×12", available as APR4128 from ACT Laboratories, Inc., Hillsdale, Mich.). The drawn down coating layer was baked for 30 minutes at 140° C.

Acetone rub solvent resistance was used to determine the cure of the paint. Cheesecloth was moistened with acetone and, with moderate pressure, at a rate of about 1 double rub per second, rubbed over the painted panel. This test is typically run to 100 double rubs or failure of the coating, which ever occurs first. The higher the number of rubs, the better the cure of the coating. The cured film resulting from Example 3A was hard and did not fail after 100 double rubs with acetone.

Example 3B

A coating composition was prepared by combining 60 grams of CTFE-vinyl acetate-vinyl alcohol copolymer of example 2 with 27 grams of Desmodur N3390 (polyisocyanate commercially available from Bayer Material Science, Pittsburgh, Pa.), 300 grams of butyl acetate, and 1 gram of dibutyltindilaurate as catalyst. The mixture was drawn down 3 mil thick over an electrodeposition primer coated steel panel (cold rolled steel panels 4"×12", available as APR4128 from ACT Laboratories, Inc., Hillsdale, Mich.). The drawn down coating layer was baked for 30 minutes at 140° C. The cured film resulting from Example 3B was hard and did not fail after 100 double rubs with acetone.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:
1. A thermosetting composition comprising:
 (a) a fluoropolymer composition comprising at least one reactive functional group containing fluoropolymer comprising:
  (i) units derived from chlorotrifluoroethylene, and
  (ii) units derived from at least one donor monomer, wherein the units (i) and (ii) are distributed along the fluoropolymer chain in a substantially alternating fashion; and
 (b) at least one crosslinking agent comprising at least two functional groups reactive with the functional groups of the fluoropolymer, and
 wherein the fluoropolymer is present in the thermosetting composition in an amount of at least 20 weight percent, based on the total solid weight of the composition.

2. A substrate at least partially coated with thermosetting composition of claim 1.

3. The thermosetting composition of claim 1, wherein the fluoromonomer is present in an amount of 25 to 50 mole percent, based on the total moles of material present in the fluoropolymer composition.

4. The thermosetting composition of claim 1, wherein the donor monomer comprises a mild donor monomer.

5. The thermosetting composition of claim 1, wherein the donor monomer comprises a vinyl ester, an isobutylene type monomer, or a mixture thereof.

6. The thermosetting composition of claim 5, wherein the vinyl ester comprises vinyl acetate, vinyl butyrate, vinyl 3,4-dimethoxybenzoate, vinyl propionate, vinyl neodecanoate, vinyl pivolate, vinyl neononanoate, vinyl benzoate, or a mixture thereof.

7. The thermosetting composition of claim 1, wherein at least 70 mol % of the units (i) and (ii) are distributed along the fluoropolymer chain in a substantially alternating fashion.

8. The thermosetting composition of claim 1, wherein the fluoropolymer has a number average molecular weight ranging from 500 to 10,000 as determined from gel permeation chromatography using polystyrene standards.

9. The thermosetting composition of claim 1, wherein the fluoropolymer has a polydispersity index of less than 2.0.

10. The thermosetting composition of claim 1, wherein the reactive functional groups of the fluoropolymer comprise hydroxyl groups.

11. The thermosetting composition of claim 1, wherein the composition is a liquid composition.

12. The thermosetting composition of claim 1, wherein the composition is a powder composition.

13. The thermosetting composition of claim 1, wherein the fluoropolymer is present in the thermosetting composition in an amount of 20 to 80 weight percent, based on the total solid weight of the composition.

14. The thermosetting composition of claim 1, wherein the fluoropolymer is formed from a mixture of reactants comprising (i) chlorotrifluoroethylene, and (ii) at least one donor monomer, wherein the mole ratio of chlorotrifluoroethylene to donor monomer that is mixed is no more than 4:1.

15. The thermosetting composition of claim 11, wherein the composition comprises at least 40 percent solids based on the total weight of the composition.

16. A method for coating a substrate comprising:
(a) depositing on a substrate the thermosetting composition of claim 1;
(b) coalescing the thermosetting composition to form a substantially continuous film on the substrate; and
(c) curing the thermosetting composition.

17. A method of making a fluoropolymer composition comprising:
(a) providing a donor monomer composition comprising at least one donor monomer;
(b) providing a fluoromonomer composition comprising chlorotrifluoroethylene;
(c) providing at least one free radical polymerization initiator;
(d) mixing the components provided in steps (a), (b), and (c) at a mole ratio of chlorotrifluoroethylene to at least one donor monomer of no more than 4:1; and
(e) polymerizing the mixture resulting from step (d) at conditions that produce a fluoropolymer wherein units derived from the fluoromonomer and units derived from the donor monomer are distributed along the fluoropolymer chain in a substantially alternating fashion.

18. The method of claim 17, wherein the mole ratio is no more than 2:1.

19. The method of claim 17, further comprising:
(f) introducing at least one functional group to the fluoropolymer.

20. A thermosetting composition comprising:
(a) a fluoropolymer composition produced by the method of claim 19, and
(b) at least one crosslinking agent comprising at least two functional groups reactive with the at least one functional group of the fluoropolymer.

* * * * *